No. 736,676. PATENTED AUG. 18, 1903.
P. BLAUBACH.
MACHINERY FOR MANUFACTURING PATTERNED LINOLEUM.
APPLICATION FILED JAN. 16, 1902.
NO MODEL. 2 SHEETS—SHEET 1.
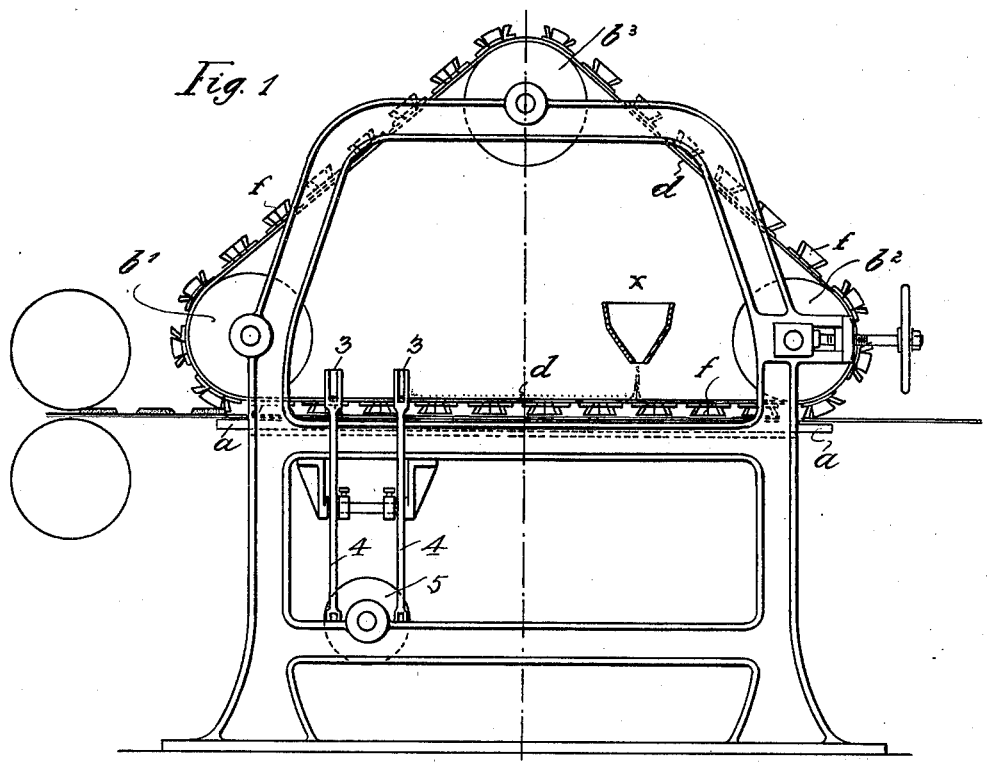
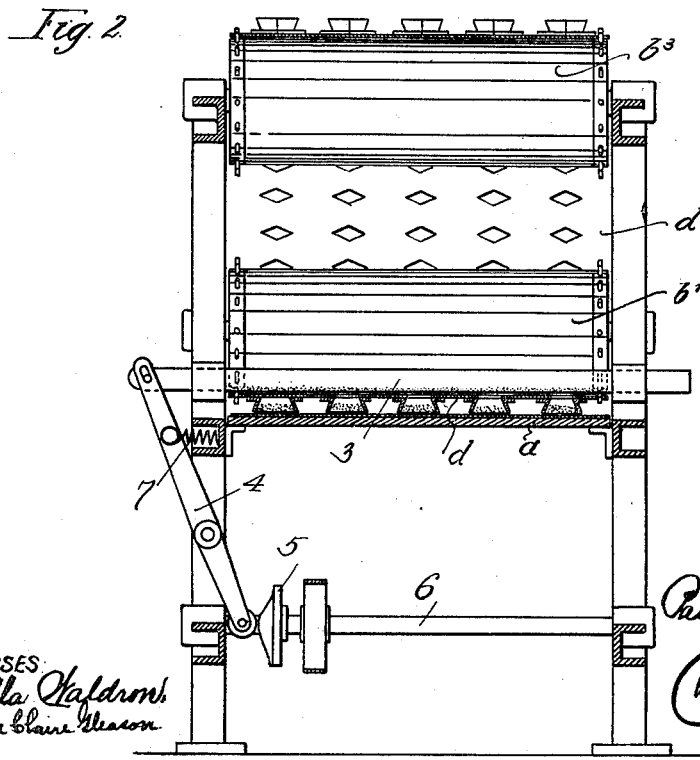
WITNESSES
Isabella Waldron
Adelaide Elaine Mason
INVENTOR.
Paul Blaubach
BY Richardson
ATTORNEYS.

No. 736,676. PATENTED AUG. 18, 1903.
P. BLAUBACH.
MACHINERY FOR MANUFACTURING PATTERNED LINOLEUM.
APPLICATION FILED JAN. 16, 1902.
NO MODEL. 2 SHEETS—SHEET 2.
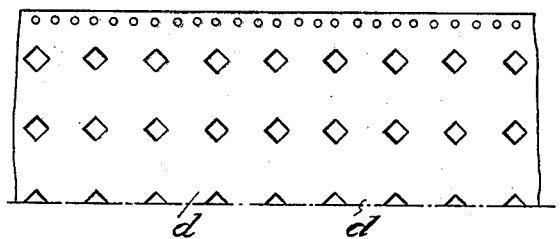
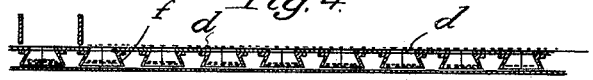
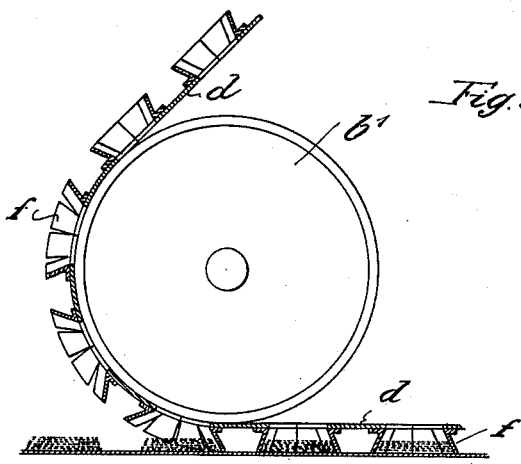
WITNESSES:
Isabella Waldron.
Adelaide Claire Gleason.
INVENTOR,
Paul Blaubach
BY Richardson
ATTORNEYS.

No. 736,676. Patented August 18, 1903.

UNITED STATES PATENT OFFICE.

PAUL BLAUBACH, OF BREMEN, GERMANY.

MACHINERY FOR MANUFACTURING PATTERNED LINOLEUM.

SPECIFICATION forming part of Letters Patent No. 736,676, dated August 18, 1903.

Application filed January 16, 1902. Serial No. 90,090. (No model.)

*To all whom it may concern:*

Be it known that I, PAUL BLAUBACH, merchant, residing at Am Deich 8, Bremen, in the Empire of Germany, have invented some Improvements in Machinery for Manufacturing Patterned Linoleum, of which the following is a full and clear specification.

The present invention relates to a machine for manufacturing linoleum with patterns formed by masses of colored composition.

According to the new invention the machine is provided with one or more endless bands having perforations corresponding to the contour of the pattern required. Around the perforations raised edges or marginal walls of suitable height are provided to form molds and made of such material as does not prejudice the flexible character of the band. For this purpose the walls may be of elastic material or of some rigid substance, such as metal, provided with slits or notches which permit of the walls spreading when the band passes around the rollers. Each mold-band is designed for a single color of the linoleum composition. If, however, special arrangements are made, several colors can be applied by means of the same band. Several machines may be arranged one behind the other, so that the linoleum runs through them in succession.

The invention is illustrated by the annexed drawings, in which—

Figure 1 is a side elevation of the machine. Fig. 2 shows a cross-section of the same. Fig. 3 is a plan view of a portion of the perforated mold-band. Fig. 4 is a longitudinal section of a portion of the same. Fig. 5 is an end elevation of one of the rollers, showing in section the mold-band passing around it over the fabric.

The main framing of the machine supports a table $a$, which may be stationary and constructed of flat boards or of rollers or may be movable and consist of an endless apron. The fabric to which the linloeum composition is applied travels over this table and between a pair of rollers. The endless mold-band $d$ is carried by rollers $b'$ $b^2$ $b^3$ and travels just above the fabric and parallel with its surface. The colored composition is fed to the molds located on the portion of the mold-band traveling for the time being close above the table. The color may be applied by hand or mechanically by suitable apparatus operated in any desired manner. The mold-band is made of any suitable material—such as metal, woven fabric, leather, slats, or the like—and provided with the desired perforations. Around the latter are the walls $f$, composed of any material sufficiently elastic to admit of stretching on passing around the rollers, or they may be of other material and provided with slits or notches, so that the wall consists of a number of divided parts capable of spreading out on passing around the rollers, as shown in Fig. 5. The diameter of the rollers and their location in the machine are such that the colored composition is properly deposited at the parts required. If the linoleum is to receive several colors, a corresponding number of such mold-bands are employed or a number of colors may be applied by means of a single band. The precise method of applying the composition may be any desired, as this in no way affects the essential features of the invention.

The hopper for feeding the material into the band carrying the molds is shown at $x$ in Fig. 1. At 3 I show bars arranged to reciprocate across the top of the band carrying the molds. These bars are reciprocated by levers 4, operated by a cam 5 on a rotary shaft 6. The bars facilitate the deposition of the composition material into the molds, and they prevent any of the material being carried to the roller $b'$ by the movement of the band. The levers 4 are kept pressed against the cam by springs 7.

Having thus described my invention, what I claim, and desire to secure by Letters Patent, is—

1. A machine for manufacturing patterned linoleum, comprising a table over which the fabric travels, rollers mounted above said table, and an endless band provided with perforations surrounded on the outer side of the band by walls, and traveling over said rollers immediately above the fabric, whereby colored composition fed onto the fabric through the perforations is molded by said walls, substantially as described.

2. In a machine for manufacturing patterned linoleum, an endless band provided with perforations surrounded on the outer side of the band by walls forming molds, substantially as and for the purposes specified.

3. In a machine for manufacturing patterned linoleum, an endless band provided with perforations surrounded on the outer side of the band by walls forming molds capable of spreading out on passing over rollers adapted to carry said band, substantially as and for the purposes specified.

In witness whereof I have hereunto signed my name this 19th day of December, 1901, in the presence of two subscribing witnesses.

PAUL BLAUBACH.

Witnesses:
FRANCIS A. BRYCE,
FREDERICK HOYERMANN.